United States Patent [19]
Betremieux et al.

[11] Patent Number: 5,962,146
[45] Date of Patent: *Oct. 5, 1999

[54] EPDM/EPM RUBBER COATED WITH A POLYAMIDE-BASED FILM-WITHOUT ADHESIVE

[75] Inventors: Isabelle Betremieux, Beaumontel; Christian Dousson, St-Victor de Chretienville; Philippe Marcq, Bernay, all of France

[73] Assignee: Elf Atochem S.A., Puteaux, France

[*] Notice: This patent issued on a continued prosecution application filed under 37 CFR 1.53(d), and is subject to the twenty year patent term provisions of 35 U.S.C. 154(a)(2).

[21] Appl. No.: 08/990,589

[22] Filed: Dec. 15, 1997

Related U.S. Application Data

[62] Division of application No. 08/503,749, Jul. 18, 1995.

[30] Foreign Application Priority Data

Jul. 19, 1994 [FR] France .................................. 94 08905

[51] Int. Cl.⁶ ..................................................... B32B 27/08
[52] U.S. Cl. ...................................... 428/476.9; 428/474.4; 428/475.5; 428/475.8; 428/476.1; 428/500; 525/66
[58] Field of Search ........................... 525/66; 428/474.4, 428/475.5, 475.8, 476.1, 476.9, 500

[56] References Cited

U.S. PATENT DOCUMENTS 5,154,979  10/1992  Kerschbaumer et al. ........... 428/476.9

*Primary Examiner*—Helen L. Pezzuto
*Attorney, Agent, or Firm*—Pennie & Edmonds LLP

[57] ABSTRACT

The invention relates to a material including:
  a polymer A including:
  1) at least one product chosen from polyamides, polyamide blends and copolymers which have polyamide blocks and polyether blocks,
  2) at least one product chosen from polyethylene, ethylene copolymers, polypropylene and propylene copolymers, these products being grafted with an unsaturated dicarboxylic acid or its anhydride,
  the polymer A adhering essentially without adhesive to a vulcanized EPDM or EPM rubber.

5 Claims, No Drawings

EPDM/EPM RUBBER COATED WITH A POLYAMIDE-BASED FILM-WITHOUT ADHESIVE

This is a divisional of application Ser. No. 08/503,749, filed Jul. 18, 1995, pending.

FIELD OF THE INVENTION

This invention relates to a resinous material comprising (1) at least one polyamidic material chosen from polyamides, polyamide blends, and copolymers which have polyamide blocks and polyether blocks and (2) at least one olefinic material chosen from polyethylene, ethylene copolymers, polypropylene, and propylene copolymers, the olefinic material being grafted with an unsaturated carboxylic acid or an unsaturated dicarboxylic acid or its anhydride. This resinous material adheres essentially without adhesive to vulcanized ethylene-propylene monomer (EPM) or ethylene-propylene-diene monomer (EPDM) rubber.

In another aspect, this invention relates, for example, to EPDM seals coated with a polyamide-based film adhering to EPDM essentially without adhesive. The polyamide-based film used in this aspect of the invention includes (i) polyamide or block copolymers which have polyamide blocks and polyether blocks and (ii) polyethylene or polypropylene grafted with maleic anhydride and optionally containing polyamide grafts. The polyamide-based film can also serve as binder and can itself be coated with another film. In this embodiment, there is therefore EPDM, polyamide-based film, and another film, in succession.

BACKGROUND OF THE INVENTION

U.S. Pat. No. 5,154,979 describes objects obtained by coinjection of two incompatible polymers. A grafted polyolefin is added to one of the polymers to obtain a good adhesiveness along the weld line separating the two polymers. The examples describe mixtures of polyamide, of polypropylene grafted with maleic anhydride, and of glass fibers which adhere to SEBS (styrene-ethylene/butene-styrene block copolymer) or to SANTOPRENE, which is a polypropylene filled with EPDM rubber.

DE 3 914 011 describes pipes which have an inner layer made of polyamide or a mixture of polyamide and polyolefin covered with rubber which may be EPDM. An adhesive must be added between these two layers to make the combination tough and durable. These layers are then covered with reinforcements and finally with rubber.

EP 266 982 describes thermoplastic elastomers coated with polyamide, polyurethane, or polyester. Thermoplastic elastomers are obtained by the reaction of crosslinkable olefinic rubber (EPDM), of a polyolefin (polypropylene), and of an unsaturated acid, an epoxide, or unsaturated hydroxy monomer. These products are useful as car window slide rails.

FR 2 322 166 describes the plasma treatment of an EPDM to improve the adhesiveness.

FR 2 274 670 describes adhesives for securing polyamide to EPDM.

SUMMARY OF THE INVENTION

A much simpler process has now been found for obtaining vulcanized EPDM coated with polyamide or polyamide-based copolymer. It suffices to add a polyolefin grafted with maleic anhydride to the polyamide or to the polyamide-based copolymer to obtain an adhesiveness such that the separation can take place only by rupture of the polyamide film or of the EPDM.

The present invention provides a polymeric material capable of adhering without adhesive to vulcanized EPDM or EPM rubber. This polymeric material of the invention comprises (1) at least one polyamidic material selected from the group consisting of a polyamide, a polyamide blend, and a copolymer which has polyamide blocks and polyether blocks, and (2) at least one olefinic material selected from the group consisting of polyethylene, ethylene copolymer, polypropylene, and propylene copolymer. In accordance with the present invention, the olefinic material is grafted with an unsaturated carboxylic acid or an unsaturated dicarboxylic acid or its anhydride.

The polymeric material of the invention is capable of self-adhering to vulcanized EPDM and EPM with a peel strength of at least 1.5 DaN/cm.

The present invention also provides an article of manufacture comprising a section consisting of a deformable metal core covered with vulcanized EPDM or EPM rubber, wherein a film of polymeric material as described above covers all or part of the rubber. This film of polymeric material may be covered with a polymer which is compatible with said polymeric material, such as a polyamidic material selected from the group consisting of a polyamide, a polyamide blend, and a copolymer which has polyamide blocks and polyether blocks.

DESCRIPTION OF THE PREFERRED EMBODIMENTS

The present invention is therefore a material including a polymer A including:

1) at least one product chosen from polyamides, polyamide blends, copolymers which have polyamide blocks and polyether blocks, 2) at least one product chosen from polyethylene, ethylene copolymers, polypropylene and propylene copolymers, these products being grafted with an unsaturated carboxylic acid or an unsaturated dicarboxylic acid or its anhydride, the polymer A adhering essentially without adhesive to a vulcanized EPDM or EPM rubber.

Polyamide within the meaning of the product A(1) is intended to mean the products which have

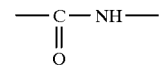

units along the main chain.

They can result from the reaction of a dicarboxylic acid such as adipic acid with a diamine such as hexamethylenediamine. They can also result from the condensation of a lactam such as caprolactam or lauryllactam or from the condensation of an alpha,omega-amino acid such as aminoundecanoic acid. Examples of polyamides (PA) which may be mentioned are PA 6, PA 6,6, PA 11, PA 12, PA 6,4, PA 6,10, and PA 6,12. These products are known per se.

The polyamide blends according to A(1) may be, for example, blends of the above polyamides with polyolefins such as polyethylene, polypropylene or copolymers such as, for example, copolymers of ethylene and of an alpha-olefin, of ethylene and of an alkyl (meth)acrylate or of ethylene and a vinyl ester of a saturated carboxylic acid. These products are known per se.

The polymers containing polyamide blocks and polyether blocks result from the copolycondensation of polyamide sequences containing reactive ends with polyether sequences containing reactive ends, such as, among others:

1) Polyamide sequences containing diamine chain ends with polyoxyalkylene sequences containing dicarboxylic chain ends.
2) Polyamide sequences containing dicarboxylic chain ends with polyoxyalkylene sequences containing diamine chain ends, obtained by cyanoethylation and hydrogenation of aliphatic alpha,omega-dihydroxylated polyoxyalkylene sequences called polyetherdiols.
3) Polyamide sequences containing dicarboxylic chain ends with polyetherdiols, the products obtained being, in this particular case, polyetheresteramides.

The polyamide sequences containing dicarboxylic chain ends originate, for example, from the condensation of alpha, omega-amino carboxylic acids, of lactams or of dicarboxylic acids and diamines in the presence of a dicarboxylic acid chain limiter. The polyamide blocks are advantageously made of polyamide-12 or of polyamide-6.

The number molecular mass Mn of the polyamide sequences is between 300 and 15,000 and preferably between 600 and 5000. The mass Mn of the polyether sequences is between 100 and 6000 and preferably between 200 and 3000.

The polymers containing polyamide blocks and polyether blocks can also include randomly distributed units. These polymers can be prepared by the simultaneous reaction of the polyether and of the precursors of the polyamide blocks.

It is possible, for example, to react polyetherdiol, a lactam (or an alpha,omega-amino acid) and a diacid chain limiter in the presence of a little water. A polymer is obtained which has essentially polyether blocks and polyamide blocks of very variable length, but also the various reactants which have reacted randomly, which are distributed statistically along the polymer chain.

Whether they originate from the copolycondensation of polyamide and polyether sequences prepared previously or from a single-step reaction, these polymers containing polyamide blocks and polyether blocks exhibit, for example, Shore D hardness values which may be between 20 and 75 and advantageously between 30 and 70 and an intrinsic viscosity between 0.8 and 2.5, measured in meta-cresol at 250° C., with an initial concentration of 0.8 g/100 ml.

Whether the polyether blocks are derived from polyethylene glycol, from polyoxypropylene glycol or from polyoxytetramethylene glycol, they are either employed as such and copolycondensed with polyamide blocks containing carboxylic ends or they are aminated to be converted into polyetherdiamines and condensed with polyamide blocks containing carboxylic ends. They can also be mixed with polyamide precursors and a chain limiter to make polymers containing polyamide blocks and polyether blocks which have statistically distributed units.

Polymers containing polyamide and polyether blocks are described in U.S. Pat. Nos. 4,331,786, 4,115,475, 4,195,015, 4,839,441, 4,864,014, 4,230,838, and 4,332,920. The disclosures of each of these patents is expressly incorporated by reference herein.

The polyether may be, for example, a polyethylene glycol (PEG), a polypropylene glycol (PPG) or a polytetramethylene glycol (PTMG). The latter is also called polytetrahydrofuran (PTHF).

Whether the polyether blocks are in the chain of the polymer containing polyamide blocks and polyether blocks in the form of diols or of diamines, they are called, for simplicity, PEG blocks or PPG blocks or else PTMG blocks.

It would not constitute a departure from the scope of the invention if the polyether blocks contained units other than units derived from ethylene glycol (—OC$_2$H$_4$—), from propylene glycol

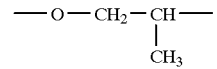

or from tetramethylene glycol (—O—(CH$_2$)$_4$—).

The polymer containing polyamide blocks and polyether blocks preferably includes a polyamide block of only one type and polyether blocks of only one type. Polymers containing PA-12 blocks and PTMG blocks and polymers containing PA-6 blocks and PTMG blocks are advantageously employed.

The polymer containing polyamide blocks and olyether blocks is advantageously such that the polyamide is the preponderant constituent, that is to say that the quantity of polyamide which is in the form of blocks and that which is possibly distributed statistically in the chain represents 50% by weight or more of the polymer containing polyamide blocks and polyether blocks.

With regard to the part A(2) of the polymer A among the ethylene copolymers it is possible to mention ethylene-alpha-olefin copolymers or copolymers of ethylene with at least one unit chosen from alkyl (meth)acrylates or vinyl esters of saturated carboxylic acids.

With regard to the products A(2), examples of anhydride which may be mentioned are citraconic anhydride, itaconic anhydride, tetrahydrophthalic anhydride, 2-methylmaleic anhydride, 2,3-dimethylmaleic anhydride and maleic anhydride.

The grafting of the anhydride can be performed on the molten polymer or in a solvent medium. The degree of grafting, that is to say the weight of the grafts in relation to the grafted polymer may be between 0.05 and 5%.

The proportions of A(1) and A(2) may vary from 70 parts of A(1) per 30 parts of A(2) to 30 parts of A(l) per 70 parts of A(2).

According to an advantageous form of the invention the product A(2) is additionally grafted with polyamides or monofunctional polyamide oligomers which can react with the acid, the diacid or anhydride. The same polyamide units are preferably employed as those existing in the products A(1).

For example, to the grafted (co)polymer A(2) there is added the polyamide monoamine oligomer, P, of formula:

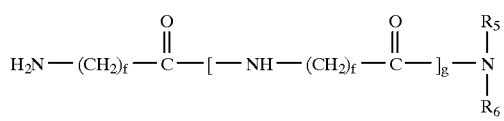

in which:

f is between 3 and 11 g is between 5 and 80

R$_5$ is hydrogen or an alkyl containing up to 20 carbon atoms,

R$_6$ is an alkyl or alkenyl group which has up to 20 carbon atoms, a cycloaliphatic radical, an aromatic one or a combination of the above.

This polyamide monoamine oligomer can be obtained by polycondensation of an amino acid of formula:

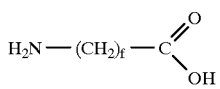

or by polyaddition of a lactam of formula:

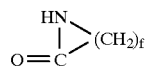

in which f has the meaning given above, in the presence of a monofunctional polymerization limiter of formula:

in which $R_5$ and $R_6$ have the meaning given above.

The preferred amino acid or lactam monomers for the synthesis of the monoamine oligomer according to the invention are chosen from caprolactam, 11-aminoundecanoic acid or dodecalactam.

The preferred monofunctional polymerization limiters are laurylamine and oleylamine.

The polycondensation defined above is performed according to the processes which are usually known, for example at a temperature which is generally between 200 and 300° C., in vacuum or under inert atmosphere, with stirring of the reaction mixture.

The average chain length of the oligomer is determined by the initial molar ratio of the polycondensable monomer or lactam to the monofunctional polymerization limiter.

In order to calculate the average chain length one molecule of chain limiter is usually counted per one oligomer chain.

The addition of the polyamide monoamine oligomer to the grafted (co)polymer is performed by the reaction of one amine functional group of the oligomer with at least one anhydride or acid functional group of the grafted (co)polymer. Amide or imide bonds are thus created.

The addition of the oligomer to the grafted (co)polymer is preferably carried out in the molten state. It is also possible to blend the oligomer and the (co)polymer in an extruder at a temperature which is generally between 230 and 250*C. The average residence time of the molten stock in the extruder may be between 15 seconds and 5 minutes and preferably between 1 and 3 minutes.

The addition of the oligomer to the grafted (co)polymer is evaluated by selective extraction of the free polyamide oligomers, that is to say those which have not reacted to form the final grafted copolymer.

EPDM rubber is a copolymer of ethylene, of propylene and of a diene, it being possible for the unsaturated sites of the diene to be vulcanized with sulphur. The dienes are either unconjugated straight-chain diolefins or cyclic or bicyclic dienes. Examples of dienes which may be mentioned are 1,4-hexadiene, dicyclopentadiene or ethylenenorbornene; the quantity of diene may be, for example, between 1 and 10% by weight of EPDM. EPM rubber is an ethylene-propylene copolymer.

It would not constitute a departure from the scope of the invention to add rubbers such as the styrene-butadiene rubbers (SBR) and nitrile-butadiene rubbers (NBR) to the EPM or to the EPDM, provided that the EPDM or EPM remains the major component.

The material of the invention may be a sheet of vulcanized EPDM or EPM rubber covered with a film of polymer A. It may also be a seal or a section consisting of a deformable metal core covered with vulcanized EPDM or EPM rubber, a film of polymer A covering all or part of the EPDM or EPM. These sections are, for example, motor vehicle door seals; the deformable metal core enables the material of the invention to be clipped or clamped to the motor vehicle bodywork.

The material of the invention may also be in the form of a tube made of vulcanized EPDM or EPM covered outside and/or inside with a film of polymer A.

The material of the invention can be produced by lamination or coextrusion of a film of polymer A over the vulcanized EPDM or EPM rubber. It is also possible to coextrude the EPDM or EPM before Vulcanization with the film of polymer A and then to vulcanize the rubber, provided that the polymer A withstands the vulcanization temperature. This variant is possible only if the polymer A has a melting point which is higher than the vulcanization temperature of the EPDM or EPM, for example in the case of mixtures with a high polyamide content.

It would not constitute a departure from the scope of the invention to place an adhesive between the vulcanized EPDM rubber and the polymer A.

According to another embodiment of the invention the material of the invention may be covered with another polymer B. In this case the film of polymer A is rather a binder.

This polymer B is a polymer or a mixture of polymers which are preferably compatible with the polymer A. B may be chosen from polyamides, polyamide blends and copolymers which have polyamide blocks and polyether blocks B is preferably the same product as A(1).

For example, a material of the invention is a section which may contain a deformable metal core covered with vulcanized EPDM or EPM rubber covered with a binder made of polymer A, and then there is a film of polymer B on the binder.

For example, the binder has a thickness of 10 to 50 pm and the film of polymer B a thickness of 50 to 250 μm.

EXAMPLES

The following non-limiting examples illustrate the invention.

Example 1

50 parts of amide block polyether and 50 parts of PA11-grafted polypropylene are compounded in a single-screw extruder in which the speed of the screw is controlled at 150 rev/min. The extrusion temperature is between 225 and 250° C. and the extruder throughput is fixed at 20 kg/h.

The composition (I) leaving the die is obtained in the form of reeds of average particle size equal to approximately 3 mm.

The amide block polyether employed consists of 66% of PA-12 sequences (Mn=2000) and 33% of PTMG sequences (Mn=1000), marketed by Elf Atochem under the name PEBAX.

The PPgPA-11 was obtained by grafting a maleinized PP with 25 mass % of PA-11 oligomers (Mn=2800).

The EPDM employed, VISTALON 6630 from Exxon, was formulated conventionally with carbon black, a paraffinic oil, and a sulphur vulcanization system.

The EPDM/(I) composite can be produced either by overmolding or by repeated extrusion. We shall describe here the overmolding process carried out in a compression mould, it being known that extrusion trials resulted in the same adhesiveness values.

a) Preparation of the rubber blank: the blank is cut with the aid of an outline die, to dimensions of 100×40×4 mm and vulcanized at 180° C. for 5 min.

b) Preparation of the compound (I) blank: films of approximately 1 mm thickness were obtained by compression-molding and cut with an outline die to dimensions of 100×40×1 mm.

c) In the compression mould the compound is heated to 200° C. (melt) for 3 min without pressure at the surface of the vulcanized EPDM. A slight pressure is applied for 2 min to ensure the forming of the blank. The composite is then cooled under water circulation.

Depending on the application requirements, this composite can then be covered with a layer of PEBAX, of polyamide, or of a blend with a polyamide matrix.

Example 2

A composition II consisting of 60 parts of amide block polyether and 40 parts of PA-12-grafted polypropylene is compounded under the same conditions as in Example 1.

The amide block polyether employed consists of 66% of PA-12 sequences (Mn=2000) and 33% of PTMG sequences (Mn=1000), marketed by Elf Atochem under the name PEBAX.

The PPgPA-12 was obtained by grafting a maleinized PP with 25 mass % of PA-12 oligomers (Mn=2800).

A composite II is then produced under the same conditions as those described in I.

Example 3

A composition (III) consisting of 40 parts of amide block polyether and 60 parts of PA-6-grafted polypropylene is compounded under the same conditions as in I.

The amide block polyether employed consists of 66% of PA-6 sequences (Mn=1300) and of 33% of PTMG sequences (Mn=650), marketed by Elf Atochem under the name PEBAX.

The PPgPA-6 was obtained by grafting a maleinized PP with 25 mass % of PA-6 oligomers (Mn=2800).

A composite III is then produced under the same conditions as those described in I.

Example 4: Peel Strength and Cohesiveness

The peel strength is measured after 24 hours according to NFT standard 46008. Peeling is initiated by providing an adhesion-free region between the vulcanized elastomer and compound (I), (II), or (III) as produced in the preceding Examples with the aid of an adhesive aluminum strip placed over the compound before overmolding with the elastomer. The results for the elastomer/compound composites is as follows:

| Composite | I | II | III |
|---|---|---|---|
| Peel Strength DaN/cm | 1.90 | 2.10 | 2.00 |
| Rupture observed | cohesive | cohesive | cohesive |

The result "cohesive" means that rupture occurred in the PEBAX film or in the EPDM film and not in the interface of the two materials.

Having thus described the invention, it is to be understood that the above embodiments can be modified or changed without departing from the spirit and scope of the invention as set forth in the claims hereinbelow.

What is claimed is:

1. An EPDM or EPM rubber coated with a polyamide-based film without adhesive consisting of a vulcanized ethylene-propylene EPDM or EPM rubber and a film of polymeric material, said film comprising 1) at least one polyamidic material selected from the group consisting of a polyamide, polyamides blends, and a copolymer which has polyamide blocks and polyether blocks, and 2) at least one olefinic material selected from the group consisting of polyethylene, ethylene copolymer, polypropylene, and propylene copolymer, wherein said olefinic material is grafted with an unsaturated carboxylic acid or an unsaturated dicarboxylic acid or its anhydride.

2. The rubber coated with a polyamide-based film without adhesive according to claim 1, wherein said film of polymeric material is capable of self-adhering to vulcanized EPDM and EPM rubber with a peel strength of at least 1.5 DaN/cm.

3. An EPDM or EPM rubber coated with a polyamide-based film without adhesive consisting of a vulcanized ethylene-propylene EPDM or EPM rubber and a film of polymeric material, said film comprising 1) at least one polyamidic material selected from the group consisting of a polyamide and a copolymer which has polyamide blocks and polyether blocks, and 2) at least one olefinic material selected from the group consisting of polyethylene, ethylene copolymer, polypropylene, and propylene copolymer, wherein said olefinic material is grafted with maleic anhydride.

4. The rubber coated with a polyamide-based film without adhesive according to claim 3, wherein said film of polymeric material has a thickness of 10 $\mu$m to 50 $\mu$m.

5. An EPDM or EPM rubber coated with a first polyamide-based film and a second film without adhesives consisting of a vulcanized ethylene-propylene EPDM or EPM rubber, a first film of polymeric material, and a second film of polymeric material which is compatible with the polymeric material of the first film, wherein said rubber and said films are capable of adhering to each other without adhesives, and said first film of polymeric material comprising 1) at least one polyamidic material selected from the group consisting of a polyamide, polyamide blends, and a copolymer which has polyamide blocks and polyether blocks, and 2) at least one olefinic material selected from the group consisting of polyethylene, ethylene copolymer, polypropylene, and propylene copolymer, wherein said olefinic material is grafted with an unsaturated carboxylic acid or an unsaturated dicarboxylic acid or its anhydride.

* * * * *